United States Patent
Stenzel et al.

(10) Patent No.: US 7,693,005 B2
(45) Date of Patent: Apr. 6, 2010

(54) SENSOR STREAMER HAVING TWO-LAYER JACKET

(75) Inventors: Andre Stenzel, Richmond, TX (US); Jan-Aake Jenssen, Vestby (NO)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 12/283,086

(22) Filed: Sep. 9, 2008

(65) Prior Publication Data

US 2010/0061189 A1   Mar. 11, 2010

(51) Int. Cl.
*G01V 1/38* (2006.01)
(52) U.S. Cl. .......................................... 367/20; 367/153
(58) Field of Classification Search .................. 367/20, 367/153, 154
See application file for complete search history.

(56) References Cited

U.S. PATENT DOCUMENTS

| | | | | |
|---|---|---|---|---|
| 3,518,677 A | * | 6/1970 | Florian | 367/154 |
| 5,089,668 A | * | 2/1992 | Harvey | 367/20 |
| 5,471,436 A | | 11/1995 | Harvey | |
| 5,521,885 A | * | 5/1996 | Harvey | 367/154 |
| 5,923,616 A | * | 7/1999 | Badger et al. | 367/16 |
| 5,943,293 A | * | 8/1999 | Luscombe et al. | 367/20 |
| 2006/0002234 A1 | | 1/2006 | Lobe et al. | |

FOREIGN PATENT DOCUMENTS

GB   2439425   12/2007

OTHER PUBLICATIONS

UK Novelty Search Report, Oct. 21, 2009.

* cited by examiner

*Primary Examiner*—Ian J Lobo
(74) *Attorney, Agent, or Firm*—E. Eugene Thigpen; Richard A. Fagin

(57) ABSTRACT

A seismic streamer includes a jacket covering an exterior of the streamer, at least one strength member extending along the length of and disposed inside the jacket, at least one seismic sensor mounted in a sensor spacer affixed to the at least one strength member, and a void filler made from a material introduced into the jacket in liquid form and undergoing state change thereafter. The jacket includes an inner layer in contact with and having adhesiveness to the void filler, and an outer layer disposed over the outer layer and having substantially no adhesiveness.

8 Claims, 2 Drawing Sheets

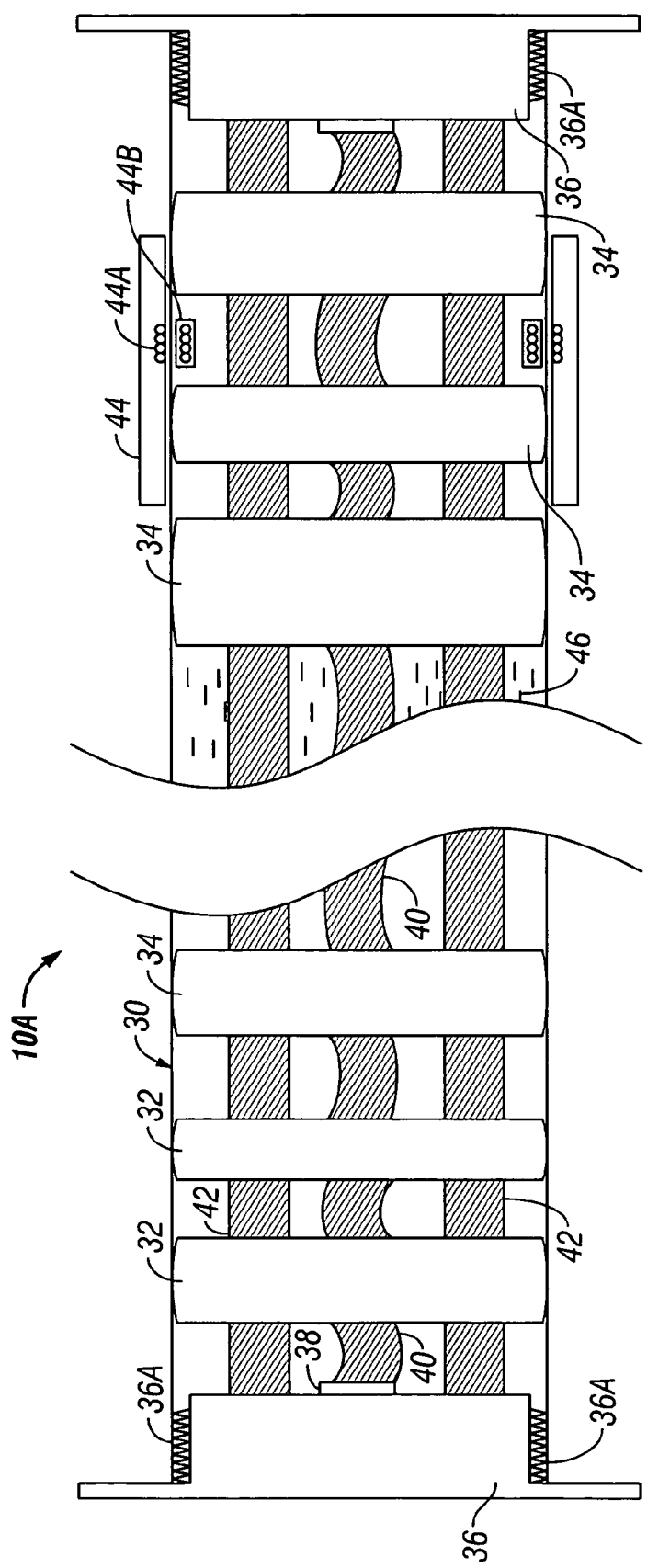
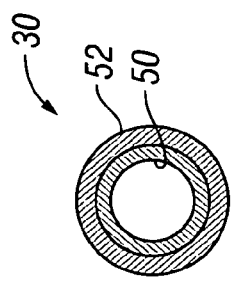
FIG. 2
FIG. 3

SENSOR STREAMER HAVING TWO-LAYER JACKET

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic data acquisition equipment. More specifically, the invention relates to structures for a marine seismic streamer, and methods for making such streamers.

2. Background Art

Marine geophysical surveying such as seismic surveying is typically performed using sensor "streamers" towed near the surface of a body of water. A streamer is in the most general sense a cable towed by a vessel. The cable has a plurality of sensors disposed thereon at spaced apart locations along the length of the cable. In the case of marine seismic surveying the sensors are typically hydrophones, but can also be any type of sensor that is responsive to the pressure in the water, or in changes therein with respect to time or may be any type of particle motion sensor or acceleration sensor known in the art. Irrespective of the type of such sensors, the sensors typically generate an electrical or optical signal that is related to the parameter being measured by the sensors. The electrical or optical signals are conducted along electrical conductors or optical fibers carried by the streamer to a recording system. The recording system is typically disposed on the vessel, but may be disposed elsewhere.

In a typical marine seismic survey, a seismic energy source is actuated at selected times, and a record, with respect to time, of the signals detected by the one or more sensors is made in the recording system. The recorded signals are later used for interpretation to infer structure of, fluid content of, and composition of rock formations in the Earth's subsurface. Structure, fluid content and mineral composition are typically inferred from characteristics of seismic energy that is reflected from subsurface acoustic impedance boundaries. One important aspect of interpretation is identifying those portions of the recorded signals that represent reflected seismic energy and those portions which represent noise.

A typical sensor streamer is assembled by coupling a plurality of streamer segments together end to end. Each segment typically includes a jacket covering the exterior, one or more strength members extending along the segment from end to end, buoyancy spacers and sensors disposed in sensor spacers at selected positions along the strength member all disposed within the jacket. Void space within the jacket not occupied by the foregoing is typically filled with a material that is introduced into the jacket in liquid form and undergoes state change to a gel like material thereafter (called buoyancy void filler or "BVF".)

A desirable property of the material used to form the jacket is adhesiveness. Adhesiveness between the inner wall of the streamer jacket and the BVF is desirable because it can extend the lifetime of a streamer segment in case of jacket damage. Adhesion of the jacket material to the BVF can reduce salt water penetration into the interstices of the streamer segment. However, adhesiveness in the outer surface of the jacket can cause difficulties in handling a streamer cable. It is especially a disadvantage during deployment and/or in emergencies when tangled streamer(s) need to be untangled.

There is a need for a streamer jacket for use in marine streamers that is adhesive on its inner wall and substantially non-adhesive on its outer wall.

SUMMARY OF THE INVENTION

One aspect of the invention is a marine sensor streamer. A seismic streamer according to this aspect of the invention includes a jacket covering an exterior of the streamer, at least one strength member extending along the length of and disposed inside the jacket, at least one seismic sensor mounted in a sensor spacer affixed to the at least one strength member, and a void filler made from a material introduced into the jacket in liquid form and undergoing state change thereafter. The jacket includes an inner layer in contact with and having adhesiveness to the void filler, and an outer layer disposed over the outer layer and having substantially no adhesiveness.

Other aspects and advantages of the invention will be apparent from the following description and the appended claims.

BRIEF DESCRIPTION OF THE DRAWINGS

FIG. 2 shows a cut away view of one embodiment of a streamer segment according to the invention.

FIG. 3 shows a two layer jacket that can be used in some examples.

DETAILED DESCRIPTION

Figure 1:
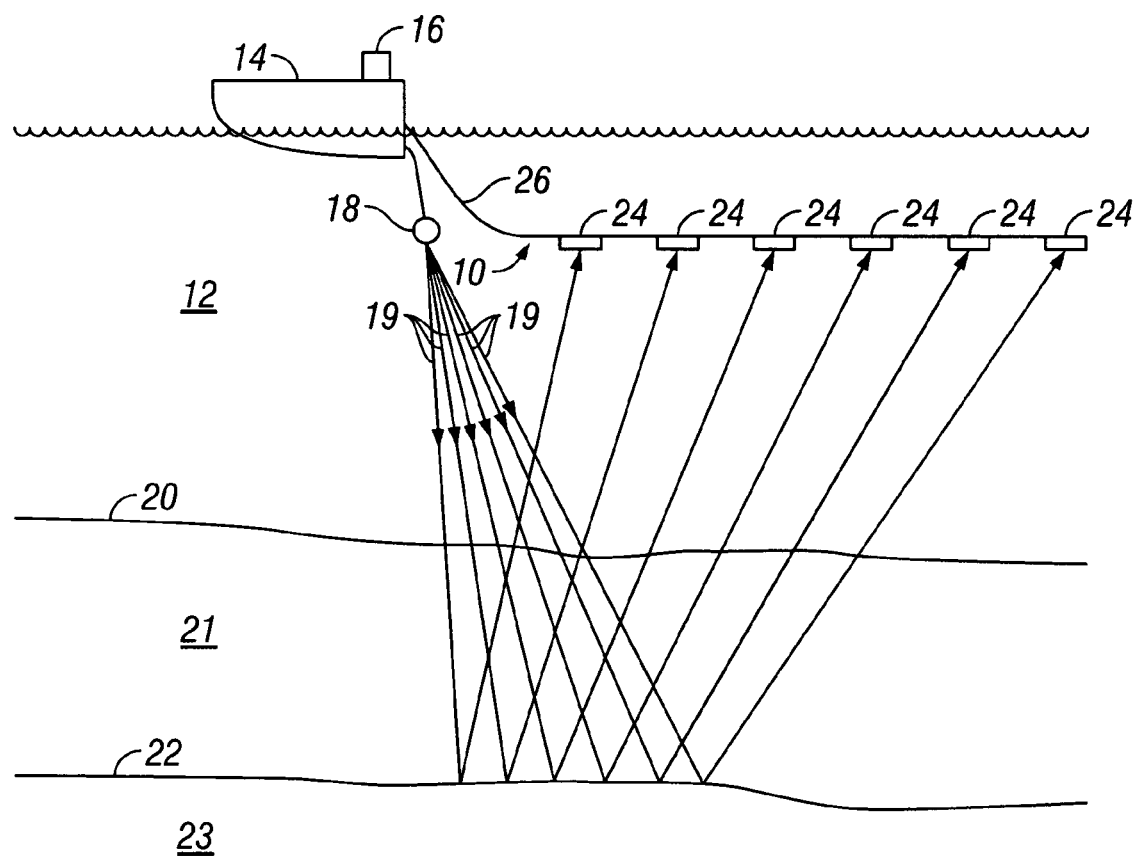
FIG. 1 shows typical marine data acquisition using a streamer according to one example of the invention.

FIG. 1 shows an example marine seismic data acquisition system as it is typically used on acquiring seismic data. A seismic vessel 14 moves along the surface of a body of water 12 such as a lake or the ocean. The marine seismic survey is intended to detect and record seismic signals related to structure and composition of various subsurface Earth formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such sources in the water 12. The seismic vessel 14 or a different vessel tows at least one seismic streamer 10 near the surface of the water 12. The streamer 10 is coupled to the vessel 14 by a lead in cable 26. A plurality of sensor elements 24, or arrays of such sensor elements, are disposed at spaced apart locations along the streamer 10. The sensor elements 24, are formed by mounting a seismic sensor inside a sensor spacer.

During operation, certain equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor element 24. Structure of the formations 21, 23, among other properties of the Earth's subsurface, can be inferred by travel time of the energy 19 and by characteristics of the detected energy such as its amplitude and phase.

Having explained the general method of operation of a marine seismic streamer, an example embodiment of a streamer according to the invention will be explained with reference to FIG. 2, which is a cut away view of a portion (segment) 10A of a typical marine seismic streamer (10 in FIG. 1). A streamer as shown in FIG. 1 may extend behind the seismic vessel (14 in FIG. 1) for several kilometers, and is typically made from a plurality of streamer segments 10A as shown in FIG. 2 connected end to end behind the vessel (14 in FIG. 1).

The streamer segment 10A in the present embodiment may be about 75 meters overall length. A streamer such as shown at 10 in FIG. 1 thus may be formed by connecting a selected number of such segments 10A end to end. The segment 10A includes a jacket 30, which in the present embodiment can be made from 3.5 mm thick polyurethane and has a nominal external diameter of about 62 millimeters. The jacket 30 will be explained in more detail below with reference to FIG. 3. In each segment 10A, each axial end of the jacket 30 may be terminated by a coupling/termination plate 36. The coupling/termination block 36 may include ribs or similar elements 36A on an external surface of the coupling/termination plate 36 that is inserted into the end of the jacket 30, so as to seal against the inner surface of the jacket 30 and to grip the coupling/termination plate 36 to the jacket 30 when the jacket 30 is secured by and external clamp (not shown). In the present embodiment, two strength members 42 are coupled to the interior of each coupling/termination plate 36 and extend the length of the segment 10A. In a particular implementation of the invention, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown), the mating coupling/termination plates 36 are coupled together using any suitable connector, so that the axial force is transmitted through the coupling/termination blocks 36 from the strength members 42 in one segment 10A to the strength member in the adjoining segment.

The segment 10A can include a selected number of buoyancy spacers 32 disposed in the jacket 30 and coupled to the strength members 42 at spaced apart locations along their length. The buoyancy spacers 32 may be made, for example, from foamed polyurethane or other suitable material. The buoyancy spacers 32 have a density selected to provide the segment 10A with a selected overall density, preferably approximately the same overall density as the water (12 in FIG. 1), so that the streamer (10 in FIG. 1) will be substantially neutrally buoyant in the water (12 in FIG. 1). As a practical matter, the buoyancy spacers 32 provide the segment 10A with an overall density very slightly less than that of fresh water. Appropriate overall density may then be adjusted in actual use by adding selected buoyancy spacers 32 and fill media having suitable specific gravity.

The segment 10A includes a generally centrally located conductor cable 40 which can include a plurality of insulated electrical conductors (not shown separately), and may include one or more optical fibers (not shown). The cable 40 conducts electrical and/or optical signals from the sensors (not shown) to the recording system (16 in FIG. 1). The cable 40 may in some implementations also carry electrical power to various signal processing circuits (not shown separately) disposed in one or more segments 10A, or disposed elsewhere along the streamer (10 in FIG. 1). The length of the conductor cable 40 within a cable segment 10A is generally longer than the axial length of the segment 10A under the largest expected axial stress on the segment 10A, so that the electrical conductors and optical fibers in the cable 40 will not experience any substantial axial stress when the streamer 10 is towed through the water by a vessel. The conductors and optical fibers may be terminated in a connector 38 disposed in each coupling/termination plate 36 so that when the segments 10A are connected end to end, corresponding electrical and/or optical connections may be made between the electrical conductors and optical fibers in the conductor cable 40 in adjoining segments 10A.

Sensors, which in the present example may be hydrophones, can be disposed inside sensor spacers, shown in FIG. 2 generally at 34. The hydrophones in the present embodiment can be of a type known to those of ordinary skill in the art, including but not limited to those sold under model number T-2BX by Teledyne Geophysical Instruments, Houston, Tex. In the present embodiment, each segment 10A may include 96 such hydrophones, disposed in arrays of sixteen individual hydrophones connected in electrical series. In a particular implementation of the invention, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer (10 in FIG. 1). It should be clearly understood that the types of sensors used, the electrical and/or optical connections used, the number of such sensors, and the spacing between such sensors are only used to illustrate one particular embodiment of the invention, and are not intended to limit the scope of this invention. In other embodiments, the sensors may be particle motion sensors such as geophones or accelerometers.

At selected positions along the streamer (10 in FIG. 1) a compass bird 44 may be affixed to the outer surface of the jacket 30. The compass bird 44 includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A).

In the present embodiment, the interior space of the jacket 30 may be filled with a material 46 such as BVF (described in the Background section herein) which may be a curable, synthetic urethane-based polymer. The BVF 46 serves to exclude fluid (water) from the interior of the jacket 30, to electrically insulate the various components inside the jacket 30, to add buoyancy to a streamer section and to transmit seismic energy freely through the jacket 30 to the sensors 34. The BVF 46 in its uncured state is essentially in liquid form. Upon cure, the BVF 46 no longer flows as a liquid, but instead becomes substantially solid. However, the BVF 46 upon cure retains some flexibility to bending stress, substantial elasticity, and freely transmits seismic energy to the sensors 34. It should be understood that the BVF used in the present example only is one example of a gel-like substance that can be used to fill the interior of the streamer. Other materials could be also used. For example, heating a selected substance, such as a thermoplastic, above its melting point, and introducing the melted plastic into the interior of the jacket 30, and subsequent cooling, may also be used in a streamer according to the invention.

An example streamer jacket made according to the invention is shown in cross section in FIG. 3. The jacket 30 may include an inner layer 50 and an outer layer 52. One example of a method for producing such a two layer jacket is double extrusion. The inner layer may be made from polyurethane that has the property of adhesiveness. Examples of such materials include one sold under product designation BFG-58887 by The Spiratex Company. Another suitable material for the inner layer 50 is sold under product designation 1185 A IOU by BASF Group.

The outer layer 52 may also be polyurethane, preferably formulated to substantially lack adhesion. The foregoing example materials for polyurethane may be used, and in addition, the outer layer material may include an anti-adhesion additive, such as one sold under product designation NMP 959 by Nu-Methods Plastics Incorporated, 4321 Northampton Rd., Cuyahoga Falls, Ohio 44223 or one sold by Americhem Inc., 2000 Americhem Way, Cuyahoga Falls, Ohio 44221. In some examples, the additive may be three percent (3%) by weight of the material used to make the outer layer 52. The additive causes the outer layer to substantially lack adhesiveness. The outer layer 52 material, however, will bond tightly to the inner layer 50 because it is also polyurethane. In the example shown in FIG. 3, the overall thickness of each layer 50, 52 may be about 1.75 mm so that the overall thickness of the jacket 30 us about 3.5 mm as explained above with reference to FIG. 2.

Streamers and streamer segments made according to the various aspects of the invention may have improved durability in the event of jacket damage as well as improved handling ability due to lack of adhesiveness of the outer surface of the jacket.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine sensor streamer, comprising:
   a jacket covering an exterior of the streamer;
   at least one strength member extending along the length of and disposed inside the jacket;
   a void filler made from a material introduced into the jacket in liquid form and undergoing state change thereafter; and
   wherein the jacket comprises an inner layer in contact with and having adhesiveness to the void filler and an outer layer disposed over the inner layer and having substantially no adhesiveness, wherein the inner layer comprises polyurethane and the outer layer comprises polyurethane having an anti-adhesiveness additive.

2. The streamer of claim 1 wherein the at least one strength member comprises fiber rope.

3. The streamer of claim 1 further comprising buoyancy spacers disposed along the strength member and inside the jacket at spaced apart locations, the spacers having a density selected to provide the streamer with a selected overall density.

4. The streamer of claim 3 wherein the buoyancy spacers comprise foamed polyurethane.

5. The streamer of claim 1 further comprising a cable disposed inside the jacket, the cable having at least one of electrical conductors and an optical fiber, the cable adapted to carry signals from at least one sensor disposed in the jacket to a recording system.

6. The streamer of claim 5 wherein the at least one sensor comprises a seismic sensor.

7. The streamer of claim 1 further comprising a termination plate coupled to each axial end of the jacket, the termination plates each coupled to the strength member at an axial end thereof, the termination plates configured to couple to a corresponding termination plate in another segment of the streamer so as to transmit axial force therethrough.

8. The streamer of claim 1 wherein the additive comprises about three percent by weight of the material used in the outer layer.

* * * * *